(12) United States Patent
Wong et al.

(10) Patent No.: US 9,150,360 B1
(45) Date of Patent: Oct. 6, 2015

(54) MECHANISM TO DELIVER FASTENER VERTICALLY

(71) Applicant: Western Digital Technologies, Inc., Irvine, CA (US)

(72) Inventors: Kelvin Wong, Selangor (MY); Komgrit Sungkhaphong, Bangkok (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/134,164

(22) Filed: Dec. 19, 2013

Related U.S. Application Data (60) Provisional application No. 61/824,316, filed on May 16, 2013.

(51) Int. Cl.
  *B25B 23/04* (2006.01)
  *B65G 25/08* (2006.01)
  *B23P 19/00* (2006.01)

(52) U.S. Cl.
  CPC .............. *B65G 25/08* (2013.01); *B23P 19/003* (2013.01); *B25B 23/04* (2013.01)

(58) Field of Classification Search
  CPC ........ B65G 27/34; B65G 47/32; B65G 47/88; B65G 47/8807; B65G 47/8884; B65G 2812/03; B23P 19/003; B23P 19/001; B23P 19/006; B27F 7/13; B25C 1/001; B25B 23/04
  USPC .............. 198/459.6, 560, 526, 529, 530, 531, 198/752.1; 81/57.37, 431, 432; 221/263, 221/264, 266, 268
  See application file for complete search history.

(56) References Cited

U.S. PATENT DOCUMENTS

| | | | |
|---|---|---|---|
| 2,273,268 A | 2/1942 | Hunter et al. | |
| 2,314,760 A | 3/1943 | Blair | |
| 2,657,721 A | 11/1953 | Shaff | |
| 3,247,874 A * | 4/1966 | MacDonald | 81/430 |
| 3,275,047 A | 9/1966 | Kulman | |
| 3,583,451 A | 6/1971 | Dixon et al. | |
| 3,680,194 A | 8/1972 | Monaghan et al. | |
| 3,900,131 A * | 8/1975 | Ehrlich | 221/169 |
| 4,114,663 A * | 9/1978 | Viner | 81/435 |
| 4,256,238 A * | 3/1981 | Naitou et al. | 221/263 |
| 4,495,841 A | 1/1985 | Mori et al. | |
| 4,627,316 A | 12/1986 | Mori et al. | |
| 4,669,359 A | 6/1987 | Shiba | |
| 4,694,974 A * | 9/1987 | Heck et al. | 221/263 |

(Continued)

OTHER PUBLICATIONS

Microtec Systems, "Microdrive G4, Screwdriver System User's Manual", Microtech Systems GmbH, Ver.0.93, Nov. 11, 2005, pp. 1-35.

(Continued)

*Primary Examiner* — Mark A Deuble (57) ABSTRACT

A fastener feeder apparatus comprising a feed rail configured to move a first and a second fastener, an actuator including a separating member adjacent the feed rail, the separating member comprising a stopper portion configured to receive the first and second fastener, a first separating portion connected to the stopper portion, the first separating portion having an angled surface configured to contact the first fastener and a top surface configured to contact the second fastener, and an aperture defined in the separating member between the stopper portion and the first separating portion, the aperture structured for receiving the first fastener.

25 Claims, 9 Drawing Sheets

(56) References Cited

U.S. PATENT DOCUMENTS

| | | | |
|---|---|---|---|
| 4,790,234 | A | 12/1988 | Hampejs et al. |
| 4,800,325 | A | 1/1989 | Nakanishi |
| 4,813,312 | A | 3/1989 | Wilhelm |
| 4,815,343 | A | 3/1989 | Sofinowski |
| 4,881,435 | A | 11/1989 | Hansson |
| 4,905,842 | A | 3/1990 | Habele et al. |
| 4,908,926 | A | 3/1990 | Takeshima et al. |
| 4,922,436 | A | 5/1990 | Dohm et al. |
| 4,924,732 | A | 5/1990 | Hoskins et al. |
| 4,955,476 | A | 9/1990 | Nakata et al. |
| 5,010,286 | A | 4/1991 | Nakamura et al. |
| 5,014,876 | A | 5/1991 | Young et al. |
| 5,019,763 | A | 5/1991 | Komatsu |
| 5,059,089 | A | 10/1991 | Kocaoglan |
| 5,090,103 | A | 2/1992 | Nakata et al. |
| 5,121,558 | A | 6/1992 | Caroe et al. |
| 5,154,242 | A | 10/1992 | Soshin et al. |
| 5,170,852 | A | 12/1992 | Shikata et al. |
| 5,186,084 | A | 2/1993 | Totsu |
| 5,215,270 | A | 6/1993 | Udocon et al. |
| 5,270,625 | A | 12/1993 | Neff |
| 5,289,886 | A | 3/1994 | Shikata et al. |
| 5,316,200 | A * | 5/1994 | Wallin .............. 227/119 |
| 5,345,766 | A | 9/1994 | Leonhartsberger et al. |
| 5,359,269 | A | 10/1994 | Wedeen et al. |
| 5,365,810 | A * | 11/1994 | Inaniwa et al. ......... 81/430 |
| 5,425,473 | A | 6/1995 | Kvalheim |
| 5,480,087 | A | 1/1996 | Young et al. |
| 5,511,933 | A | 4/1996 | Herklotz |
| 5,549,169 | A | 8/1996 | Matsumura et al. |
| 5,603,442 | A | 2/1997 | Schmidt et al. |
| 5,631,823 | A | 5/1997 | Layer et al. |
| 5,631,852 | A | 5/1997 | Chen |
| 5,708,586 | A | 1/1998 | Ikeda |
| 5,758,798 | A | 6/1998 | Duffy et al. |
| 5,777,246 | A | 7/1998 | Woods et al. |
| 5,779,127 | A | 7/1998 | Blacket et al. |
| 5,823,356 | A | 10/1998 | Goodrich et al. |
| 5,839,332 | A | 11/1998 | Fujiyama et al. |
| 5,857,587 | A | 1/1999 | Ota |
| 6,049,973 | A | 4/2000 | Frank, Jr. et al. |
| 6,086,292 | A | 7/2000 | Yokoyama |
| 6,247,387 | B1 | 6/2001 | Ketteringham |
| 6,418,818 | B1 | 7/2002 | Tham et al. |
| 6,467,153 | B2 | 10/2002 | Butts et al. |
| 6,497,036 | B1 | 12/2002 | Jenkins et al. |
| 6,543,119 | B2 | 4/2003 | Jenkins et al. |
| 6,575,347 | B2 | 6/2003 | Coonrod et al. |
| 6,588,576 | B1 * | 7/2003 | Roessler ............. 198/389 |
| 6,651,192 | B1 | 11/2003 | Viglione et al. |
| 6,657,801 | B1 | 12/2003 | Chue et al. |
| 6,680,595 | B2 | 1/2004 | Ito |
| 6,681,659 | B2 | 1/2004 | Hoe et al. |
| 6,687,093 | B1 | 2/2004 | Butler et al. |
| 6,701,212 | B2 | 3/2004 | Shiba et al. |
| 6,751,041 | B1 | 6/2004 | Codilian et al. |
| 6,787,724 | B2 | 9/2004 | Bennett et al. |
| 6,788,480 | B1 | 9/2004 | Codilian et al. |
| 6,791,782 | B1 | 9/2004 | Codilian et al. |
| 6,792,669 | B2 | 9/2004 | Codilian |
| 6,798,592 | B1 | 9/2004 | Codilian et al. |
| 6,840,929 | B2 | 1/2005 | Kurata |
| 6,894,861 | B1 | 5/2005 | Codilian et al. |
| 6,897,393 | B1 | 5/2005 | Codilian et al. |
| 6,898,044 | B1 | 5/2005 | Chheda |
| 6,943,972 | B1 | 9/2005 | Chue et al. |
| 6,945,140 | B2 | 9/2005 | Gibbons et al. |
| 6,951,298 | B1 | 10/2005 | Cogley et al. |
| 7,003,626 | B1 | 2/2006 | Chheda et al. |
| 7,027,242 | B1 | 4/2006 | Terrill et al. |
| 7,046,467 | B1 | 5/2006 | Chheda |
| 7,058,759 | B1 | 6/2006 | Reiser et al. |
| 7,072,129 | B1 | 7/2006 | Cullen et al. |
| 7,076,391 | B1 | 7/2006 | Pakzad et al. |
| 7,076,603 | B1 | 7/2006 | Chheda |
| 7,077,621 | B2 | 7/2006 | Ruden |
| 7,136,242 | B1 | 11/2006 | Chue et al. |
| 7,139,145 | B1 | 11/2006 | Archibald et al. |
| 7,145,744 | B1 | 12/2006 | Clawson et al. |
| 7,178,432 | B1 | 2/2007 | Han et al. |
| 7,199,959 | B1 | 4/2007 | Bryant |
| 7,203,020 | B1 | 4/2007 | Viglione et al. |
| 7,209,310 | B1 | 4/2007 | Tsai et al. |
| 7,222,410 | B1 | 5/2007 | Klassen et al. |
| 7,236,911 | B1 | 6/2007 | Gough et al. |
| 7,269,525 | B1 | 9/2007 | Gough et al. |
| 7,400,106 | B2 | 7/2008 | DeCicco et al. |
| 7,416,086 | B2 | 8/2008 | Lanni |
| 7,422,135 | B2 | 9/2008 | Kvalheim |
| 7,458,282 | B1 | 12/2008 | Wuester, Sr. et al. |
| 7,490,398 | B1 | 2/2009 | Klassen et al. |
| 7,506,553 | B1 | 3/2009 | Panyavoravaj |
| 7,549,204 | B1 | 6/2009 | Vangal-Ramamurthy et al. |
| 7,552,526 | B1 | 6/2009 | Klassen et al. |
| 7,559,590 | B1 | 7/2009 | Jones |
| 7,561,416 | B1 | 7/2009 | Sarraf |
| 7,596,722 | B1 | 9/2009 | Pakzad et al. |
| 7,634,375 | B1 | 12/2009 | Pakzad et al. |
| 7,653,983 | B1 | 2/2010 | Klassen |
| 7,669,711 | B1 | 3/2010 | Westwood |
| 7,671,599 | B1 | 3/2010 | Tan et al. |
| 7,673,638 | B1 | 3/2010 | Boynton et al. |
| 7,690,705 | B1 | 4/2010 | Roberts et al. |
| 7,743,486 | B1 | 6/2010 | Klassen et al. |
| 7,863,889 | B1 | 1/2011 | Bamrungtham |
| 7,869,182 | B1 | 1/2011 | Tan et al. |
| 7,869,183 | B1 | 1/2011 | Tan et al. |
| 7,874,424 | B1 | 1/2011 | Westwood |
| 7,896,218 | B2 | 3/2011 | Rakpongsiri et al. |
| 7,900,272 | B1 | 3/2011 | Tan et al. |
| 7,912,666 | B1 | 3/2011 | Pakzad et al. |
| 7,916,599 | B1 | 3/2011 | Panyavoravaj et al. |
| 7,921,543 | B2 | 4/2011 | Trongjitwikrai et al. |
| 7,940,487 | B1 | 5/2011 | Krishnan et al. |
| 7,974,038 | B2 | 7/2011 | Krishnan et al. |
| 7,980,159 | B1 | 7/2011 | Han |
| 7,987,585 | B1 | 8/2011 | Klassen et al. |
| 8,066,171 | B1 | 11/2011 | Rakpongsiri et al. |
| 8,078,421 | B1 | 12/2011 | Shastry et al. |
| 8,083,057 | B2 | 12/2011 | Kuboyama |
| 8,092,610 | B1 | 1/2012 | Tarrant |
| 8,094,414 | B1 | 1/2012 | Cheng et al. |
| 8,098,460 | B1 | 1/2012 | Jen et al. |
| 8,127,643 | B1 | 3/2012 | Tan |
| 8,135,208 | B1 | 3/2012 | Vangal-Ramamurthy |
| 8,162,366 | B1 | 4/2012 | Tan et al. |
| 8,168,033 | B1 | 5/2012 | Mohamad Nor |
| 8,180,487 | B1 | 5/2012 | Vangal-Ramamurthy et al. |
| 8,199,425 | B1 | 6/2012 | Gustafson et al. |
| 8,218,256 | B1 | 7/2012 | Lin et al. |
| 8,223,448 | B1 | 7/2012 | Haw et al. |
| 8,230,570 | B1 | 7/2012 | Choong |
| 8,245,601 | B1 | 8/2012 | Hastama et al. |
| 8,267,831 | B1 | 9/2012 | Olsen et al. |
| 8,270,118 | B1 | 9/2012 | Cheng et al. |
| 8,300,338 | B1 | 10/2012 | McFadyen |
| 8,307,537 | B1 | 11/2012 | Klassen et al. |
| 8,312,585 | B1 | 11/2012 | Tarrant |
| 8,322,235 | B1 | 12/2012 | Keopuang et al. |
| 8,327,529 | B1 | 12/2012 | Tan et al. |
| 8,335,049 | B1 | 12/2012 | Liu et al. |
| 8,345,367 | B1 | 1/2013 | Tharumalingam |
| 8,347,766 | B2 * | 1/2013 | Ota et al. ............. 81/430 |
| 8,356,384 | B1 | 1/2013 | Ferre et al. |
| 8,369,073 | B2 | 2/2013 | Trinh et al. |
| 8,379,363 | B1 | 2/2013 | Kolunthavelu et al. |
| 8,387,631 | B1 | 3/2013 | Thonghara et al. |
| 8,424,418 | B1 | 4/2013 | Wuester, Sr. et al. |
| 8,424,824 | B1 | 4/2013 | Tan et al. |
| 8,432,630 | B1 | 4/2013 | Lin et al. |
| 8,432,631 | B1 | 4/2013 | Lin et al. |
| 8,447,430 | B1 | 5/2013 | Tan et al. |
| 8,447,551 | B1 | 5/2013 | Ong et al. |
| 8,451,578 | B1 | 5/2013 | Tan et al. |

(56) References Cited

U.S. PATENT DOCUMENTS

| | | |
|---|---|---|
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 2001/0035087 A1 | 11/2001 | Subotnick |
| 2005/0039580 A1 | 2/2005 | Gibbons et al. |
| 2005/0196264 A1 | 9/2005 | Ruden |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2012/0067176 A1* | 3/2012 | Ota et al. ............... 81/57.37 |
| 2012/0181149 A1* | 7/2012 | Beckmann ............... 198/560 |
| 2013/0057986 A1 | 3/2013 | Vangal-Ramamurthy et al. |
| 2013/0248545 A1 | 9/2013 | Thongjitti et al. |

OTHER PUBLICATIONS

Microtech Systems, "Components and Systems for Total Process Controlled Screw Tightening", Microtec Systems Torque Competence, 2005/2006, pp. 1-30.

* cited by examiner

MECHANISM TO DELIVER FASTENER VERTICALLY

CROSS-REFERENCE TO RELATED APPLICATION

This application claims priority to U.S. Provisional Application No. 61/824,316, entitled "MECHANISM TO DELIVER SCREW VERTICALLY," filed on May 16, 2013, which is herein incorporated by reference in its entirety.

BACKGROUND

Disk drives, which are found in many types of computing devices, typically employ a moveable head actuator to frequently access large amounts of data stored on a disk. One example of a disk drive is a hard disk drive. A conventional hard disk drive has a head disk assembly ("HDA") including at least one magnetic disk ("disk"), a disk clamp and a disk fastener (or screw) to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

Due to the cost competitiveness of the disk drive industry, the components of a disk drive need to be assembled in a very precise and cost effective manner. In order to be cost effective, complex components of the disk drive, such as disk clamps, disks, spindle motors, HDAs, HGAs, etc., need to be assembled, with fasteners, such as screws, in a very time effective manner with a very low error rate—even though many of the components are of highly precise assembly. Also, many of these types of components often need to be assembled in a very clean fashion in which debris and contamination particles are kept to a minimum. Further, as disk drives are being actively utilized more and more by users as standard hard disk drives, enterprise hard disk drives, moveable external disk drives, and/or for use in smaller computing devices such as laptops and mobile devices (e.g. PDAs, cellphones, etc.), they are increasingly requiring smaller and smaller components for assembly.

DETAILED DESCRIPTION

The assembly process for hard disk drives is requiring the use of smaller and smaller screws. These smaller screws are becoming very difficult to feed with currently utilized feeding mechanisms because of the small screw height to head diameter ratio (i.e., the aspect ratio). In fact, many hard disk drives are utilizing screws with an aspect ratio close to 1.0 (i.e., a low aspect ratio), which are encountering many problems in the assembly process.

Disk drives need to be assembled with more reliability, performance, and compactness when utilizing screws with low aspect ratios. Presently, some screw feeders utilize a vibrating rail to transfer screws to a tube for delivery to a screw insertion assembly machine for mounting the screws to components of the disk drive.

Unfortunately, presently utilized screw feeders are encountering many problems with low aspect ratio screws. In particular, a common implementation in which a screw feeder utilizes a vibrating rail that directly drops screws into a screw guide tube encounters many problems because of the screws falling away, jamming, and flipping during the feeding process. Other problems encountered with screw driver device include cost, space, and down time in manufacturing.

Figure 1:
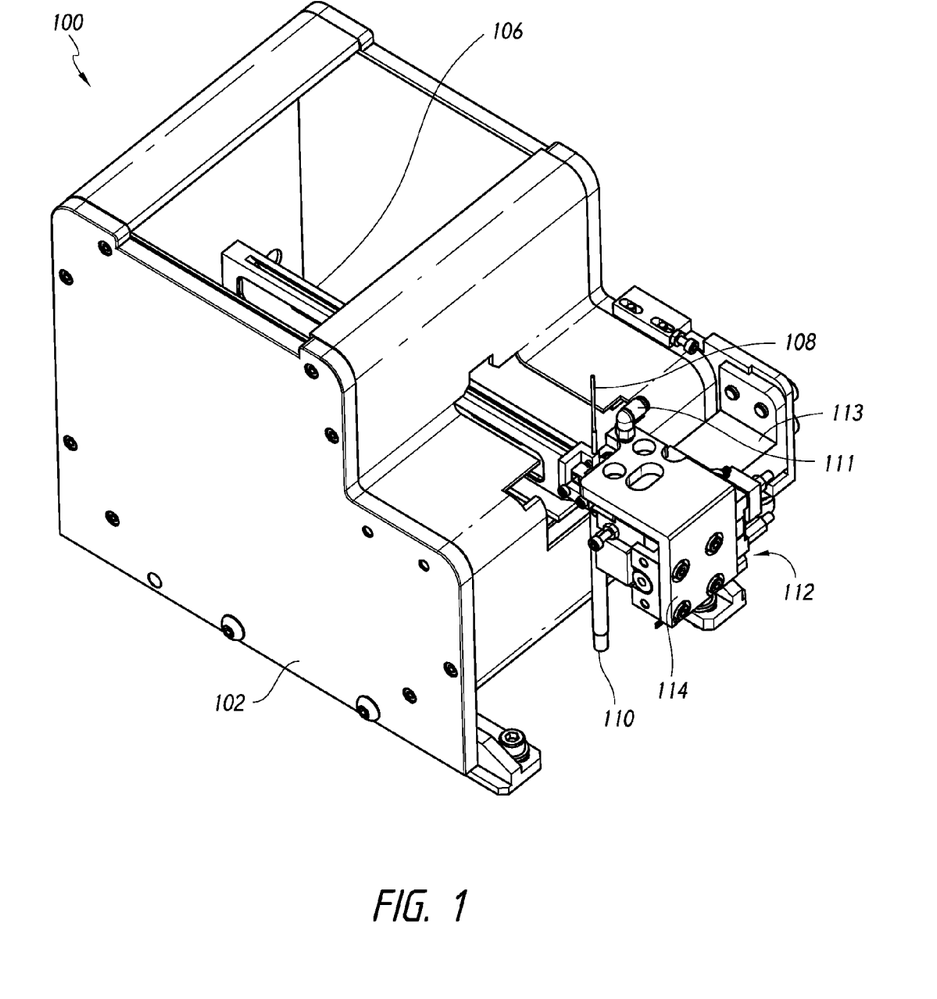
FIG. 1 is a side perspective view of a fastener feeding apparatus to deliver a fastener from a rail feeder to a feed tube, according to one embodiment.
Figure 2:
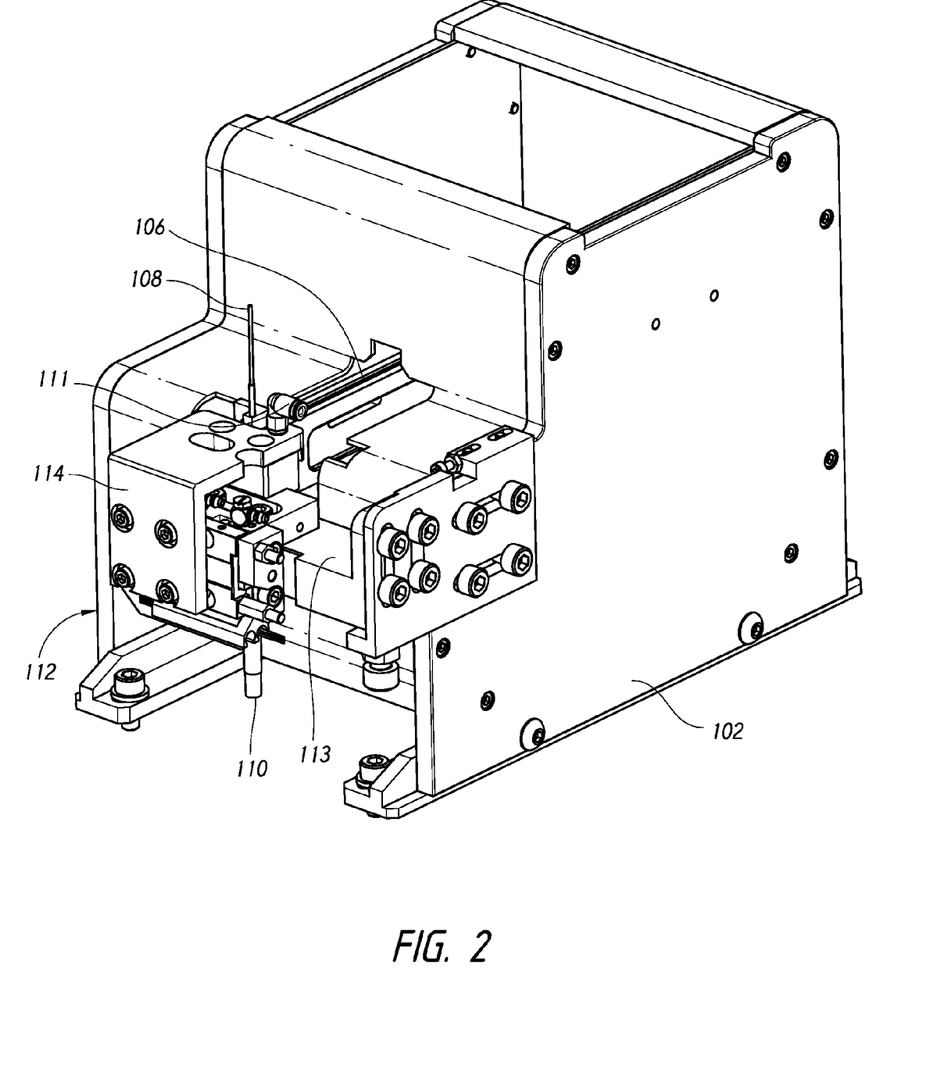
FIG. 2 is another side perspective view of the fastener feeding apparatus illustrating the first actuator, according to one embodiment.

With reference to FIGS. 1-2, a side perspective view of a fastener feeding apparatus 100 to deliver a fastener (116, 118; see FIG. 3) from a rail feeder 106 to a feed tube 110, according to one embodiment, will herein be described. Fastener feeding apparatus 100 includes a housing 102, and a feed rail 106 that can be connected to the housing 102. A fastener can include, but is not limited to, any combination of nut, bolt, stud, weldment, washer, rivet, nail, screw, or the like. The feed rail 106 vibrates to move fasteners towards actuator 112. The feed rail 106 may be partially extended towards and adjacent to actuator 112. Actuator 112 moves to further direct fasteners (116, 118; see FIG. 3) towards feed tube 110, as will be herein described. The actuator 112 includes an actuator frame 113 that is connected to the housing 102. The feed tube 110 can be made of polyurethane. Feed tube 110 can deliver fasteners (116, 118; see FIG. 3) to a fastener driver assembly machine (not shown) for use in mounting the fasteners to components. Fastener feeding apparatus 100 can include a position sensor 108 to detect the presence of a fastener (116, 118; see FIG. 3). Further, fastener feeding apparatus can include suction member 111, which is capable of collecting particles that can generated by the general operation of fastener feeding apparatus 100.

Figure 3:
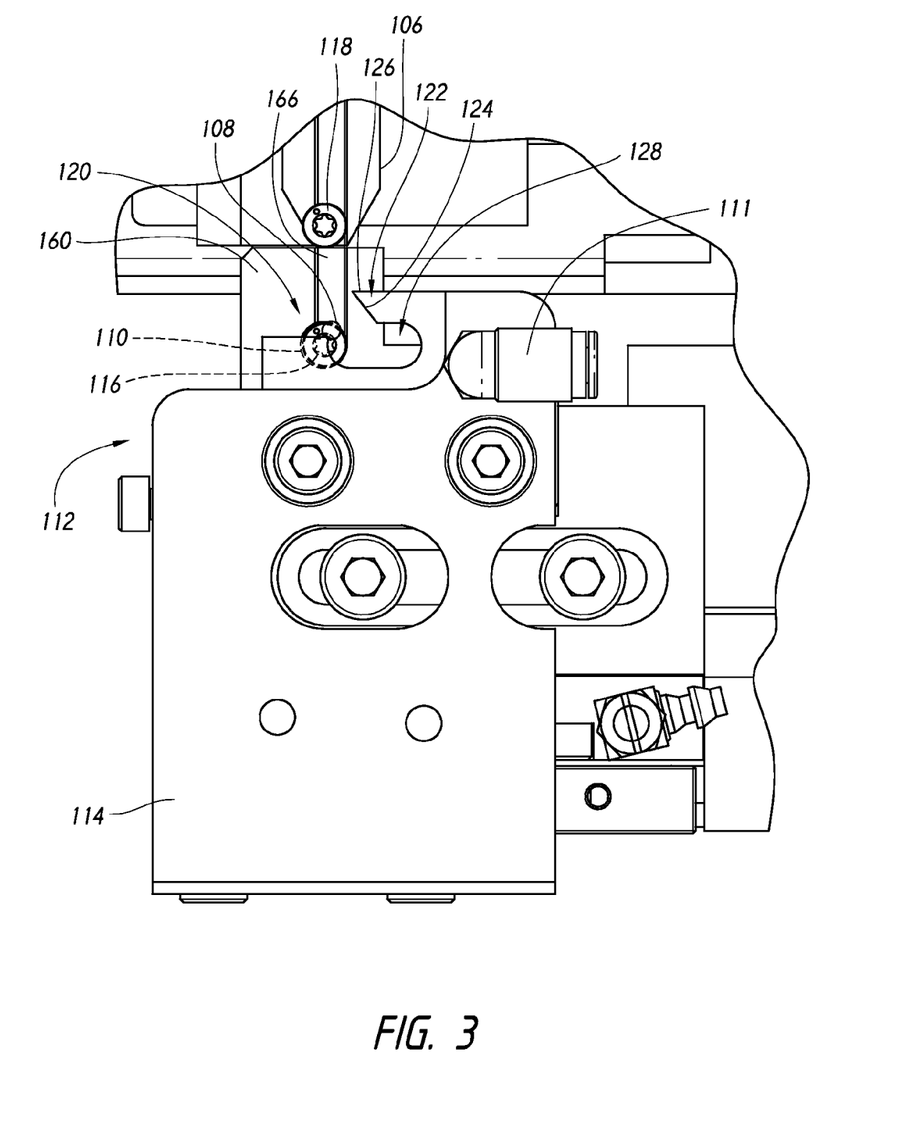
FIG. 3 is a top view of a portion of the fastener feeding apparatus illustrating an actuator, according to one embodiment.
Figure 4A:
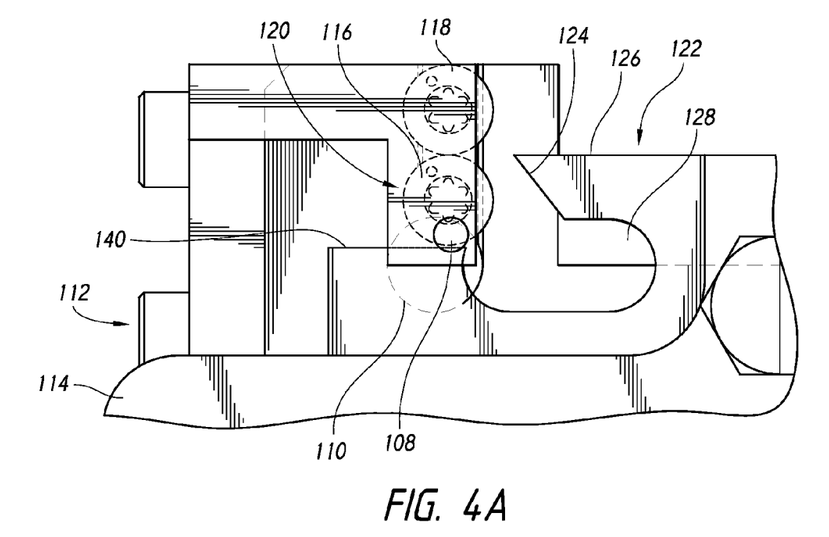
FIG. 4A is a top view of a portion of the fastener feeding apparatus illustrating an actuator, according to one embodiment.
Figure 4B:
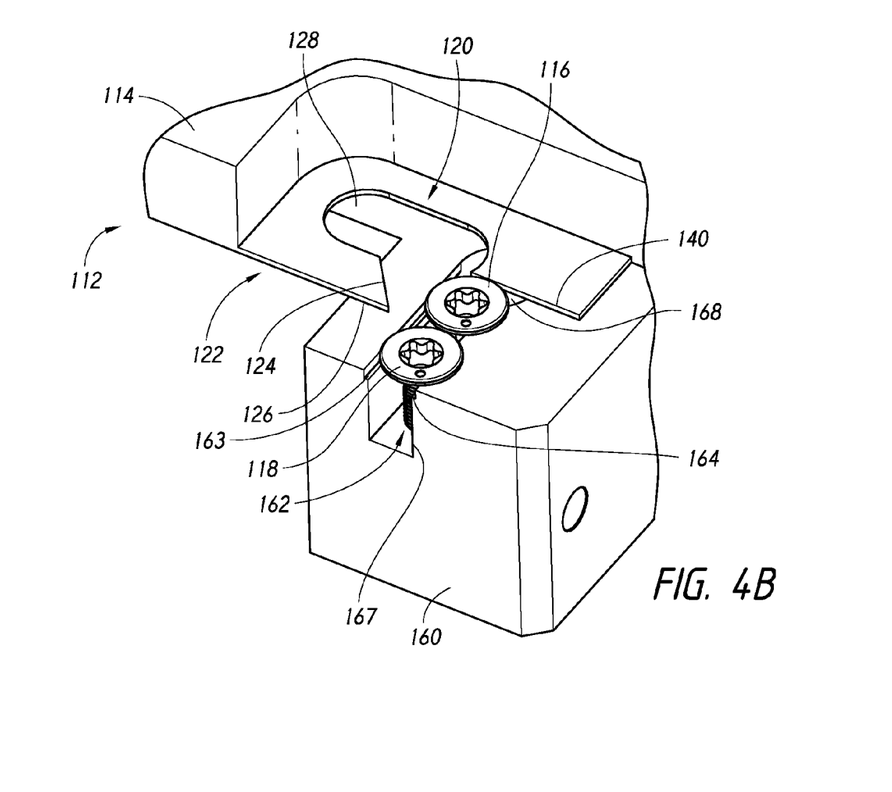
FIG. 4B is a side view of a portion of the fastener feeding apparatus illustrating an actuator, according to one embodiment.

With reference to FIGS. 3 and 4A-4B, a top view and side perspective view of a portion of the fastener feeding apparatus 100 illustrating actuator 112, according to one embodiment, will herein be described. Actuator 112 includes an actuator frame 113, actuator top cover 114, and a separating member 120. In one embodiment, the separating member 120 can extend from and be integral of the actuator top cover 114. The actuator top cover 114 is moveably connected to the actuator frame 113. The separating member 120 includes a first separating portion 122, a stopper portion 140, and an aperture 128. In this embodiment, the aperture 128 is defined between the first separating portion 122 and the stopper portion 140. The aperture 128 has an oval-type shape. The aperture 128 shape may be modified, for example, to a rectangular shape. Other shapes of the aperture 128 may be used, as long as the aperture 128 is able function as shown and described herein. Both the first separating portion 122 and stopper portion 140 of the separating member 120 extend from the actuator top cover 114. The first separating member 120 extends to a position farther from the from the actuator top cover 114 than the stopper portion 140.

As an example, the separating member 120 is "J" shaped, where the stopper portion forms a straight portion of "J" and the first separating portion 122 forms a curved or hooked portion of "J". In this embodiment, the separating member 120 extends from the actuator top cover 114 as an integral and co-planar piece. The actuator frame 113, actuator top cover 114, and separating member 120 can be made of stainless steel. Further, the actuator frame 113, actuator top cover 114, and separating member 120 can be coated with a material to reduce potential contamination from interaction with fasteners (116, 118).

The fastener feeding apparatus further includes fastener receiving block 160. The fastener receiving block 160 is connected to the actuator frame 113 (see FIGS. 1-2), and the fastener receiving block 160 is positioned adjacent to and coplanar with feed rail 106. The fastener receiving block 160 includes fastener receiving block channel 162. The fastener receiving block channel 166 has a first end 167 and a second end 168. The first end 167 has a first width adjacent the feed rail 106 for receiving the fasteners (116, 118), such that a head of fasteners (116, 118) can rest on top of the fastener receiving block 160, yet still be moved through the fastener receiving block channel 162. Fastener receiving block channel 162 can include a first fastener channel recess 163 and second channel recess 164, each extending along a tops surface of the fastener receiving block channel 162. First and second channel recess (163, 164) can be configured to match a profile of fasteners (116, 118), so that when the fastener (116, 118) enters the fastener receiving block channel 162, a stepped portion (not shown) of fasteners (116, 118) can contact and move along the first and second channel recess (163, 164). This can provide a more stable movement for fasteners (116, 118). The second end 168 of the fastener receiving block channel 162 is wider than the first end 167, which allows the fasteners (116, 118) to drop into fastener feed tube 110 positioned below the second end 168. Position sensor 108 is positioned above a portion of the second end 168. Position sensor 108 detects the presence of a fasteners (116, 118), and is capable of sending this information to a programmable logic controller (PLC), shown in FIG. 9. Examples of position sensor 108 can include an optical sensor or a proximity sensor.

The first separating portion 122 includes an angled surface 124 and top surface 126. The top surface 126 is positioned to face towards the feed rail 106. Further, the top surface 126 extends towards and is generally perpendicular to the fastener receiving block channel 162. The top surface 126 and angled surface 124 extend to and form a point on a distal end of the first separating portion 122. The angled surface 124 is positioned to face the fastener receiving block channel 162, and at some point a fastener (116, 118). As will be described in more detail below, when the actuator 112 is activated, the separating member 120 will contact fasteners (116, 118). The angled surface 124 can make contact with a fastener (116, 118), and the top surface 124 can make contact with another fastener (116. 118), thus separating the fasteners (116, 118).

Figure 5:
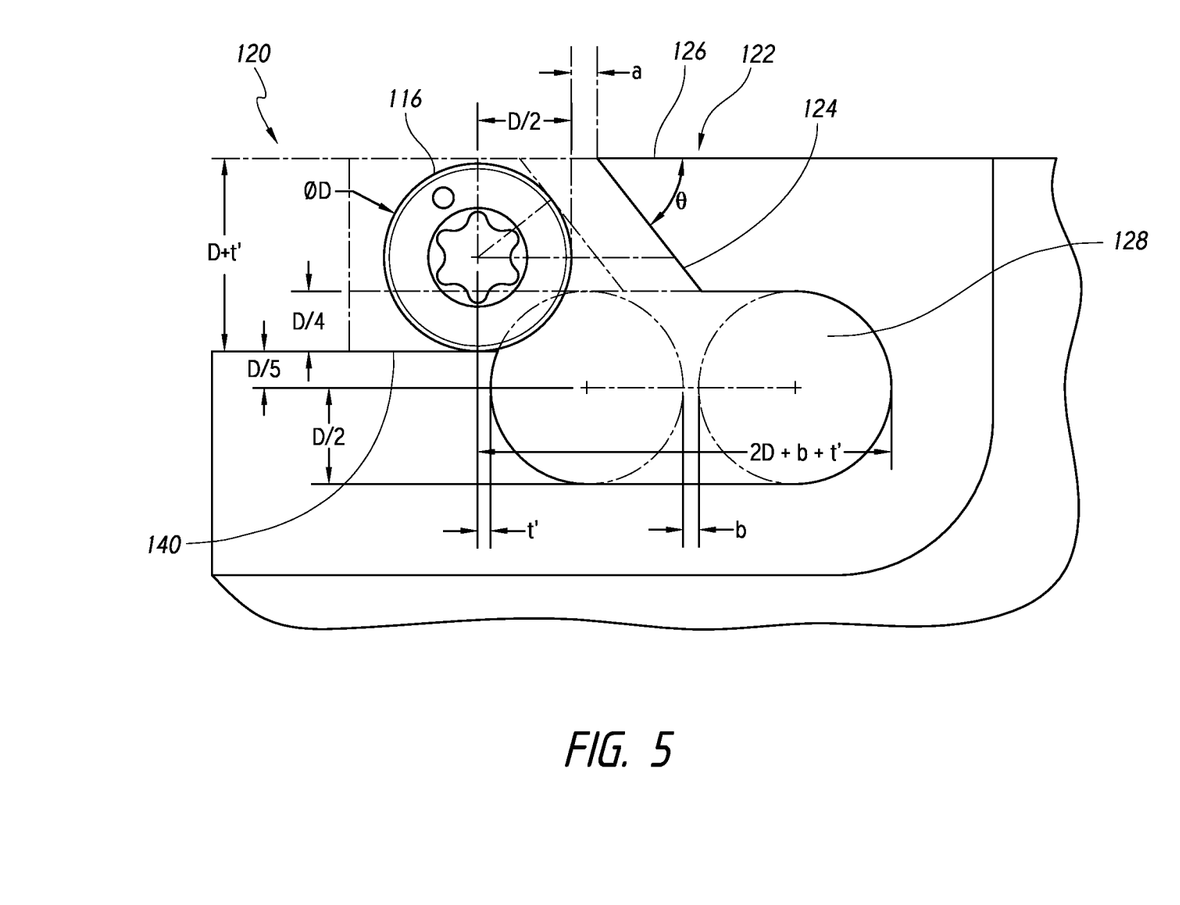
FIG. 5 is a top view of a portion of the fastener feeding apparatus illustrating dimensional characteristics of an actuator, according to one embodiment.

With reference to FIG. 5, a top view of a portion of the fastener feeding apparatus 100 illustrating dimensional characteristics of an actuator 112, according to one embodiment, will be described herein. In this embodiment, D can be defined as a fastener 116 head diameter, and a can be defined as the clearance needed to allow a fastener 116 to move past the angled surface 124 (in one embodiment, a can be in a range from 0.5-1 mm). Further, b can be defined as at least 2 times greater than a maximum tolerance of D (e.g. D+0.1/−0.00, and therefore b=2×0.1=0.2 mm). Also, t' can be defined as an offset position where a fastener 116 is stopped relative to the aperture 128 opening. This offset assures the fastener 116 will not slip into the aperture 128 before first separating portion 122 is extended. In this embodiment, t' can be 0.2 mm. Further, the top surface 126 and angled surface 124 of the first separating portion 122 are separated θ. θ can have a value in the range from 35 to 45 degrees, and can have a preferred value of 45 degrees.

Figure 6A:
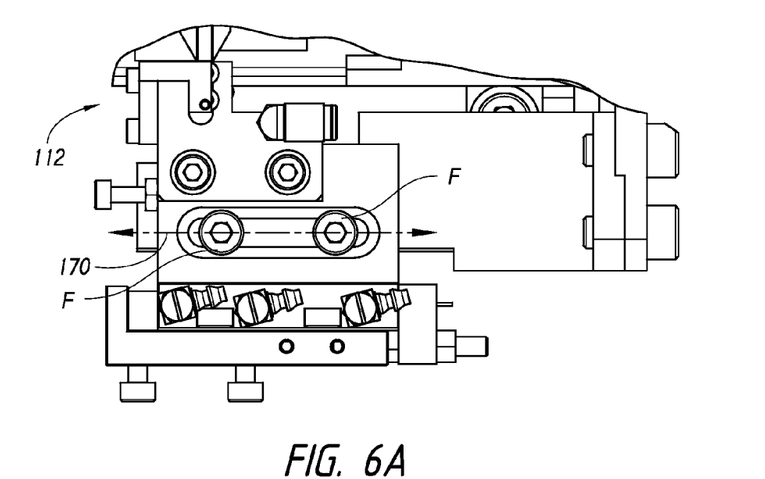
FIG. 6A is a top view of a portion of the fastener feeding apparatus illustrating an alignment feature of an actuator, according to one embodiment.
Figure 6B:
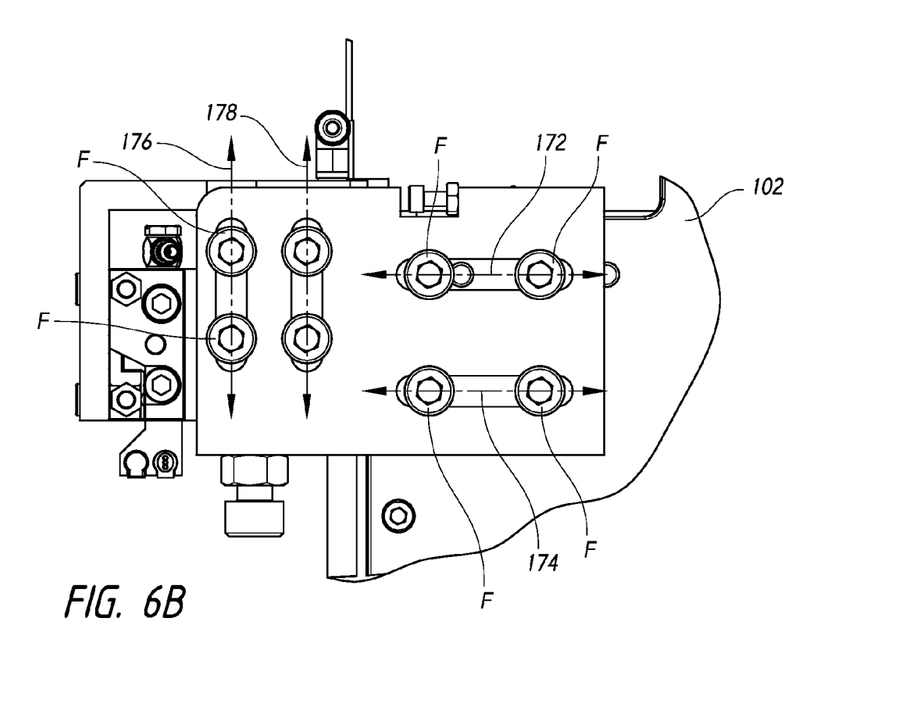
FIG. 6B is a side perspective view of a portion of the fastener feeding apparatus illustrating an alignment feature of an actuator, according to one embodiment.

With reference to FIGS. 6A-B, a top view and side view of a portion of the fastener feeding apparatus 100 illustrating alignment features of an actuator 112, according to one embodiment, will be described herein. X-direction alignment feature 170 is shown in FIG. 6A. In this embodiment, X-direction alignment feature 170 includes fasteners (F), which when unfastened allow portions of actuator frame 113 to be moved in an x-direction relative to each other. Further, Y-direction alignment features (172, 174) and Z-direction alignment features (176, 178) are shown in FIG. 6B. In this embodiment, Y-direction alignment features (172, 174) include fasteners (F), which when unfastened allow portions of actuator frame 113 to be moved in a y-direction relative to each other. Also, in this embodiment, Z-direction alignment features (176, 178) include fasteners (F), which when unfastened allow portions of actuator frame 113 to be moved in a y-direction relative to each other. Each of the alignment features (170, 172, 174, 176, 178) can be modified in location and type, without departing from the scope of embodiments herein described. For example, the alignment features can be moved to different locations on the actuator frame 113.

Figure 7:
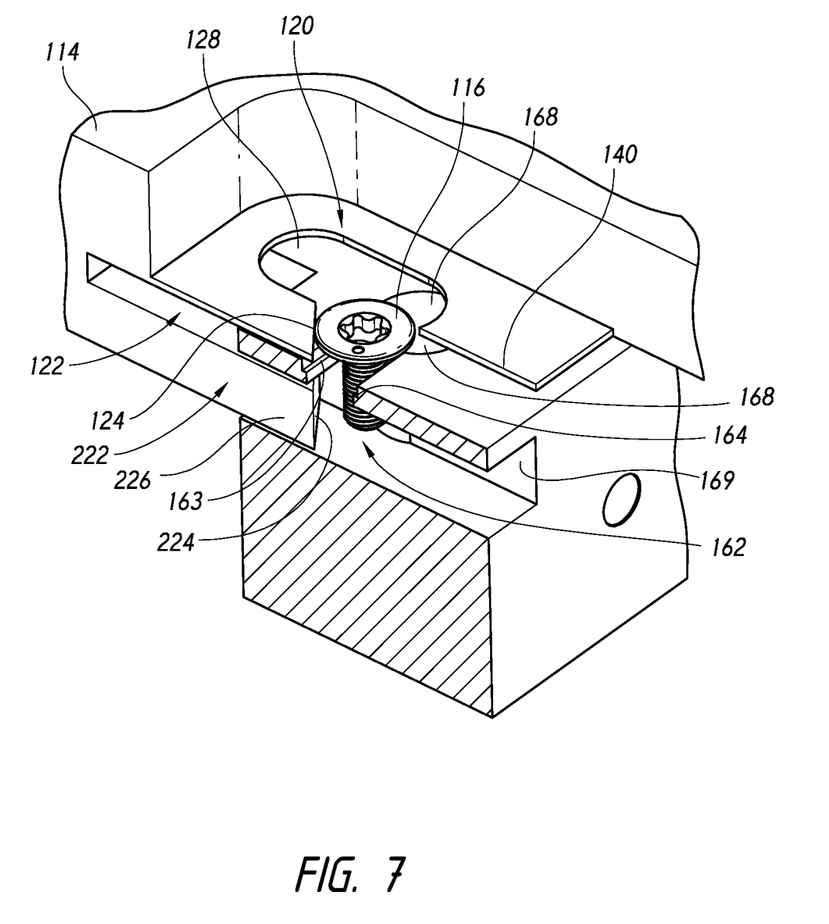
FIG. 7 is a side cross-sectional view of a portion of the fastener feeding apparatus illustrating an actuator, according to one embodiment.

With reference to FIG. 7, a side cross-sectional view of a portion of the fastener feeding apparatus 100 illustrating an actuator 212, according to one embodiment, will be described herein. Actuator 212 is similar to actuator 112, and therefore common features that have the same reference numeral will not be described. Actuator 212 includes a separating member 120 having a second separating portion 222. Second separating portion 222 is separated from and positioned below the first separating portion 122. Second separating portion 222 extends from the actuator cover 114 in a direction similar to first separating portion 222. The second separating portion 222 includes a second angled surface 224 and a second top surface 226. In this embodiment fastener receiving block 160 includes a separating member receiving channel 169. When actuated, the second separating portion extends through the separating member receiving channel 169. In this embodiment, when actuator 112 actuates, a fastener 116 will be contacted in two locations by the first angled surface 124 and the second angled surface 224, which can more stably move the fastener 116 through the fastener receiving block channel 162.

Figure 8A:
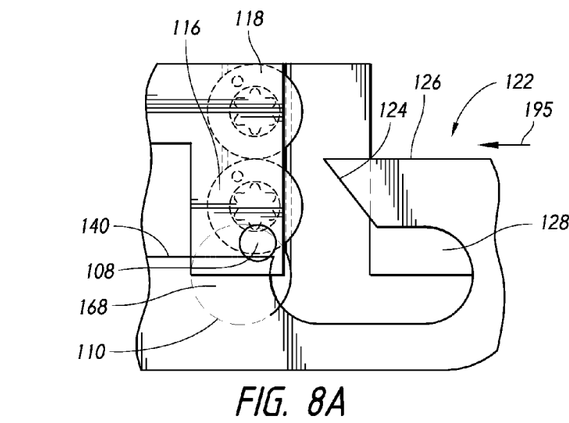
FIGS. 8A-8E are top views of a portion of the fastener feeding apparatus illustrating an actuator in various positions, according to one embodiment.
Figure 8B:
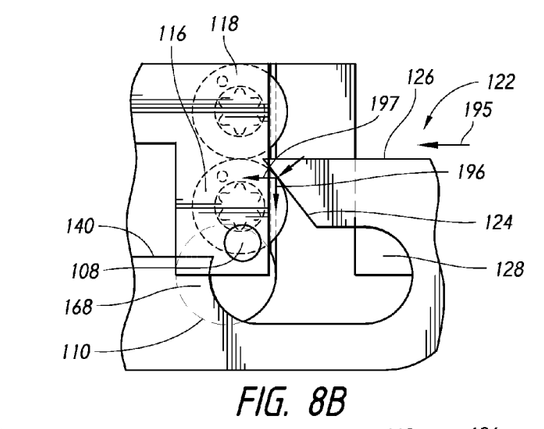
Figure 8C:
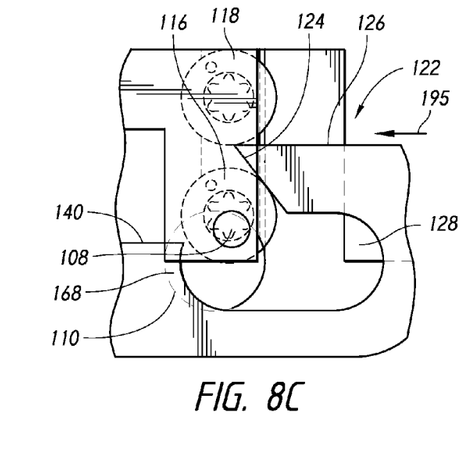
Figure 8D:
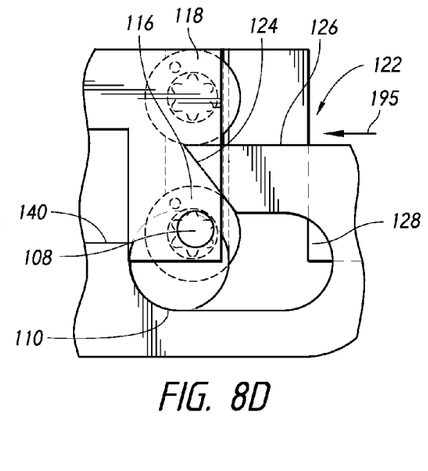
Figure 8E:
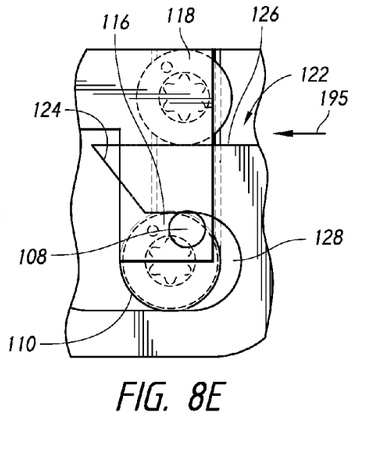

With reference to FIGS. 8A-8E and 9, top views of a portion of the fastener feeding apparatus 100 illustrating an actuator 112 in various positions and diagrams of a series of process steps to illustrate the operations of the fastener feeding apparatus 100, according to one embodiment, will be herein described. Actuator 112 will be described below and shown in FIGS. 8A-8E and 9, but actuator 212 (see FIG. 7) can be used as described and shown in these embodiments as well. Actuator 112 is movable between a resting position (FIG. 8A) and a retracted position (FIG. 8E) in the x-direction 195. In step 300, when actuator 112 is the resting position (as shown FIG. 8A), the feed rail 106 vibrates. This causes the fasteners (116, 118) to move from feed rail 106 to the fastener receiving block channel 162. In the resting position, the stopper portion 140 is positioned over a at least a portion of second end 168 of the fastener receiving block channel 162, thus stopping the fasteners (116, 118) from dropping into feed tube 110. In step 305, the fasteners (116, 118) contact stopper 140. When the position sensor 108 detects the presence of fastener 116 (step 310), the contact sensor 108 sends a signal to PLC (step 335), and the PLC (step 335) sends a signal to feed rail 106 to stop the vibration (step 315). If no fastener (116, 118) is detected, the feed rail 106 will continue to vibrate. When the feed rail 106 stops vibrating, a signal is sent (step 320) from the PLC (step 335) to the actuator 112 to move in the x-direction 195 (step 325) towards fasteners (116, 118). As shown in FIG. 8B, the angled surface 124 of the first separating portion 122 first contacts fastener 116. Fastener 116 is moved in an x-direction 196 and a y-direction 197 due to contact from the angled surface 124. As shown in FIGS. 8C and 8D, as the actuator continues to move in the x-direction 195, the top surface of the first separating portion 122 contacts fastener 118, thereby separating fastener 116 from fastener 118. Also, fastener 116 continues to move in the x-direction 196 and the y-direction 197 into the aperture 128 of the separating member 120. In FIG. 8E, the actuator 112 has moved to the retracted position (step 330). The fastener 116 is now positioned into the second end 168 of the fastener receiving block channel 162. The fastener 116 will then drop into the feed tube 110. As the fastener 116 falls into the feed tube 110, the position sensor 108 will no longer sense the presence of fastener 116. The position sensor 108 will then send a signal to PLC (step 335), and PLC (step 335) will send a signal to the actuator 112 to move back to the resting position and to the feed rail 106 to activating vibration (step 300), thereby starting the process set forth in FIG. 9 again.

Figure 9:
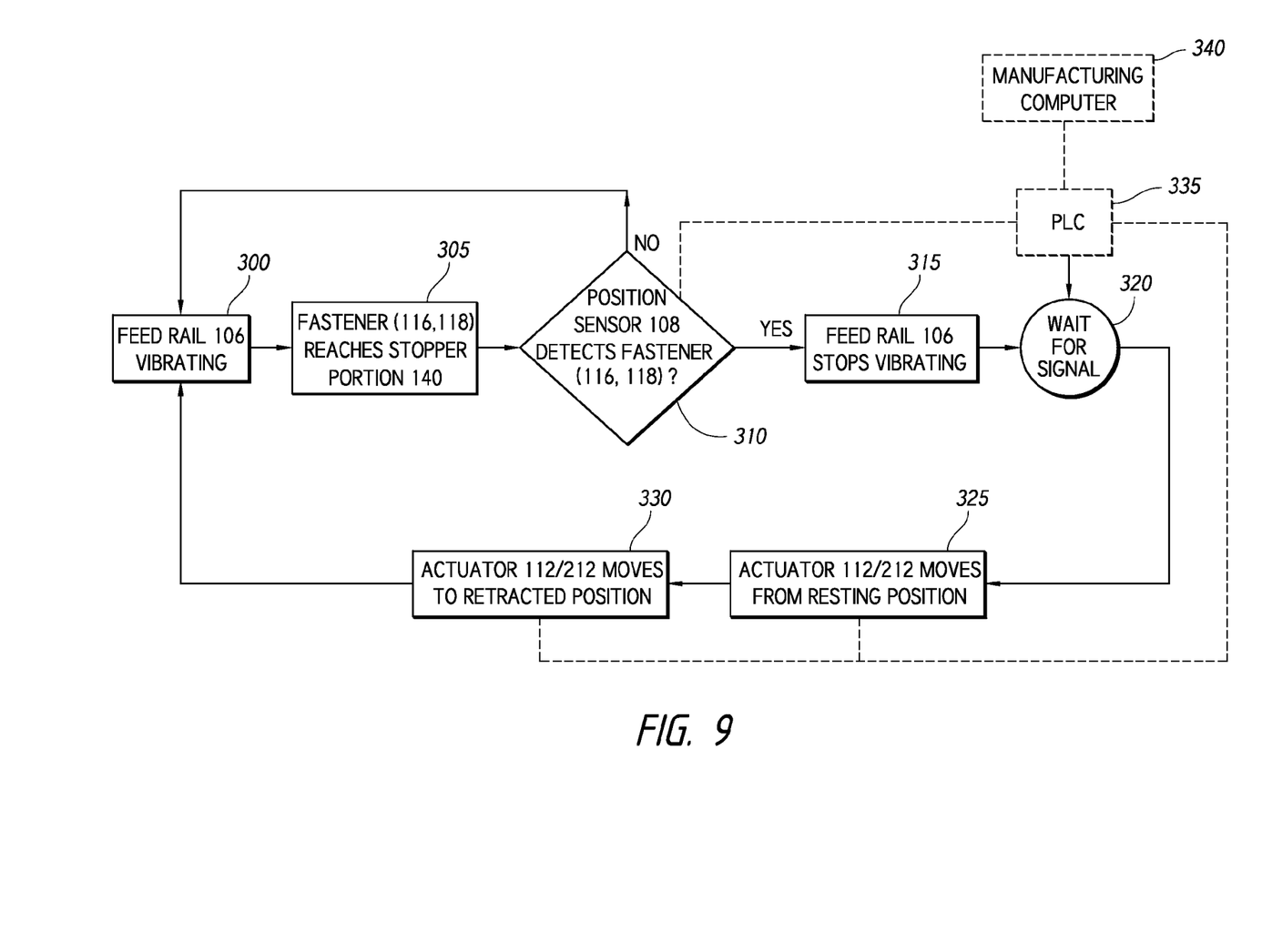
FIG. 9 show diagrams of a series of process steps to illustrate the operations of the fastener feeding apparatus, according to one embodiment.

The process of use as described above with reference to FIGS. 8A-8E and 9 can be modified without departing from the scope of the embodiments herein described. For example, in step 315, when the position sensor 108 detects the presence of fastener 116 (step 310), the contact sensor 108 can communicate with the feed rail 106 directly, instead of with the PLC (step 335; FIG. 9), to stop feed rail 106 vibration (step 315). Alternatively, a user can manually turn on/off the vibration of the feed rail 106 instead of using a PLC (step 335; FIG. 9). Another example of a modification to the process described above, as contemplated by the embodiments herein described, is in regard to movement of the actuator 112. As set for the above, when the feed rail 106 stops vibrating, a signal is sent (step 320) to the PLC (step 335; FIG. 9) and the actuator 112 is moved in the x-direction 195 (step 325) towards fasteners (116, 118). Alternatively, the signal can be sent directly from the position sensor 108 to the actuator 112. The signal can also be sent manually, or via a software program. The signal itself can be many forms, including but not limited to electrical, mechanical, or pneumatic. As discussed above, as the fastener 116 falls into the feed tube 110, the position sensor 108 will no longer sense the presence of fastener 116, causing the actuator 112 to move back to the resting position. Movement of actuator 112 from the refracted position to the resting position can be based on a timing or stroke of the actuator 112, based on a signal from the position sensor 108, or based on a signal from a limit switch. Again, the signal can be many forms, including but not limited to electrical, mechanical, or pneumatic.

As one example, actuator 112 can be pneumatically controlled. Pneumatically controlled actuators, as is well known in the art, can include pistons, internal cylinders, air inlets, and air outlets (not shown), which can be used to receive air and vacuum flow (or other gases or liquids) from air and vacuum generators (not shown) to move the actuator 112. With reference to FIG. 9, the PLC (step 335) is coupled actuator 112. In a pneumatic implementation, PLC (step 335) may control an air/vacuum generator (not shown) to provide air pressure and air vacuum to the actuator 112 to control movement in the x-direction 195, as previously described However, in other embodiments, actuator 112 may be motor controlled. As can be appreciated by those skilled in the art pneumatically controlled actuators and motor controlled actuators are well known. Further, as can be appreciated by those skilled in the art, a wide variety of different types of actuators may be utilized instead of or in addition the pneumatically controlled actuators and motor controlled actuators.

With additional reference to FIG. 9, the PLC (step 335) is configured to communicate with a manufacturing computer (step 340). For example, PLC (step 335) can communicate to the manufacturing computer (step 340) that a fastener (116, 118) has been delivered to feed tube 110. Also, the manufacturing computer (step 340) can communicate to the PLC (step 335) when a fastener (116, 118) is needed. A manufacturing computer (step 340) can be replaced with a manual process (such as manufacturing personnel pushing a button), to determine, for example, when a fastener is needed.

By utilizing the previously described mechanisms and processes the incidents of fastener dropping problems, fastener jamming problems, fastener flipping problems, and other types of problems in the fastener feeding process for manufacturing have been found to be significantly reduced. Embodiments of the previously described have been found to decrease interruption and down time in the manufacturing process.

These previous-described functions may be implemented by computer software/firmware/middleware etc. of PLC (step 335; FIG. 9) and manufacturing computer (step 340; FIG. 9). However, it should be appreciated that a wide variety of electronic devices may be utilized to perform these functions such as various types of circuitry, processors, controllers, etc., with displays and/or sound devices.

It can be appreciated by those skilled in the art that the terms "processing logic unit (PLU)", "processor", "controller", "computer" etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments may be implemented as hardware, software, firmware, microcode, or any combination thereof. When implemented in software, firmware, or microcode, the elements of the embodiment are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

Various electrical, mechanical and functional components have been described in particular embodiments, it should be appreciated that the embodiments can be implemented with a wide variety of differing electrical, mechanical and functional components, and combinations thereof. Further, although one particular embodiment has been described as being employed for use in a disk drive manufacturing process, the embodiments herein described may be implemented with numerous other types of manufacturing processes to manufacture a wide variety of different types of devices.

What is claimed is:

1. A fastener feeder apparatus comprising:
   a feed rail configured to move a first and a second fastener;
   an actuator including a separating member adjacent the feed rail, the separating member comprising:
   a stopper portion configured to receive the first and second fastener;
   a first separating portion connected to the stopper portion, the first separating portion having an angled surface configured to contact the first fastener and a top surface configured to contact the second fastener; and
   an aperture defined in the separating member between the stopper portion and the first separating portion, the aperture structured for receiving the first fastener;
   wherein the first fastener has an upper surface, further wherein the angled surface of the first separating portion is positioned to make contact with the upper surface of the first fastener when the separating member is actuated.

2. The fastener feeding apparatus of claim 1, wherein the first and second fastener have a diameter D, further wherein the aperture is greater than 2D.

3. The fastener feeding apparatus of claim 1, wherein the top surface and angled surface of the first separating portion are separated by about 45 degrees.

4. The fastener feeding apparatus of claim 1, wherein the separating member includes a second separating portion positioned below the first separating portion.

5. The fastener feeding apparatus of claim 1, wherein the aperture is oblong shaped.

6. The fastener feeding apparatus of claim 1, wherein a fastener position sensor is positioned above the actuator.

7. The fastener feeding apparatus of claim 6, wherein the separating member is moveable between a resting position and a retracted position based on a signal from the fastener position sensor.

8. The fastener feeding apparatus of claim 6, wherein in a resting position, the stopper portion of the separating member is positioned over a portion of a fastener feed tube.

9. The fastener feeding apparatus of claim 1, wherein the actuator includes a first alignment member configured to adjust the actuator in a first direction.

10. The fastener feeding apparatus of claim 9, wherein the actuator includes a second alignment member configured to adjust to the actuator in a second direction.

11. The fastener feeding apparatus of claim 9, wherein the actuator includes a third alignment member configured to adjust the actuator in a third direction.

12. The fastener feeding apparatus of claim 1, wherein the first separating portion extends in a direction perpendicular to the feed rail.

13. A fastener feeder apparatus comprising:
    a feed rail;
    an actuator including a separating member adjacent the feed rail, wherein the actuator includes a first alignment member configured to adjust the actuator in a first direction and includes a second alignment member configured to adjust to the actuator in a second direction, the separating member comprising:
    a stopper portion;
    a first separating portion connected to the stopper portion, the separating portion having an angled surface and a top surface;
    an aperture defined in the first separating member between the stopper portion and the first separating portion; and
    a feed tube positioned below the separating member;
    wherein the actuator is moveable between a resting position and a retracted position,
    wherein when the actuator is in the resting position a portion of the stopper portion is positioned over the feed tube.

14. The fastener feeding apparatus of claim 13, further comprising a sensor positioned above the separating member and feed tube, wherein the actuator is moveable based on a signal from the sensor.

15. The fastener feeding apparatus of claim 13, wherein the actuator includes a second separating portion positioned below the first separating portion.

16. The fastener feeding apparatus of claim 13, wherein the actuator includes a third alignment member configured to adjust the actuator in a third direction.

17. The fastener feeding apparatus of claim 13, wherein the aperture is oblong shaped.

18. A method of operating a fastener feeder comprising:
    providing a sensor, a fastener feed rail and an actuator having a separating member adjacent the fastener feed rail;
    vibrating the fastener feed rail to move a first and second fastener to the separating member, the vibrating step continuing until the sensor detects a first fastener is in a first location;
    actuating the separating member from a resting position to a retracted position to contact an upper surface of the first fastener, wherein the separating member contacts the first fastener on an angled surface of the separating member, the angled surface moving the fastener towards a feed tube, and a second fastener is contacted by a top surface of the separating member thereby separating the first and second fastener; and
    actuating the separating member from a retracted position to a resting position after the sensor detects the first fastener is in a second location.

19. The method of claim 18, further comprising vibrating the fastener feed rail after the first fastener is no longer detected by the sensor.

20. The method of claim 18, wherein the separating member includes a stopper portion, a separating portion connected to the stopper portion, and an aperture positioned between the separating portion and the stopper portion.

21. The method of claim 20, wherein the first fastener first contacts the separating member on the stopper portion in the resting position.

22. The method of claim 21, wherein the separating portion includes the angled surface and the top surface, further wherein when actuating the separating member the angled surface contacts the first fastener and the top surface contacts the second fastener.

23. The method of claim 18, wherein the sensor is positioned above the separating member along the same axis as a fastener feed tube.

24. The method of claim 23, wherein the separating member includes a stopper portion, a separating portion connected to the stopper portion, and an aperture positioned between the separating portion and the stopper portion, further wherein the first location is adjacent the stopper portion.

25. The method of claim 23, wherein the second location is in the fastener feed tube.

* * * * *